United States Patent Office 2,869,404
Patented Jan. 20, 1959

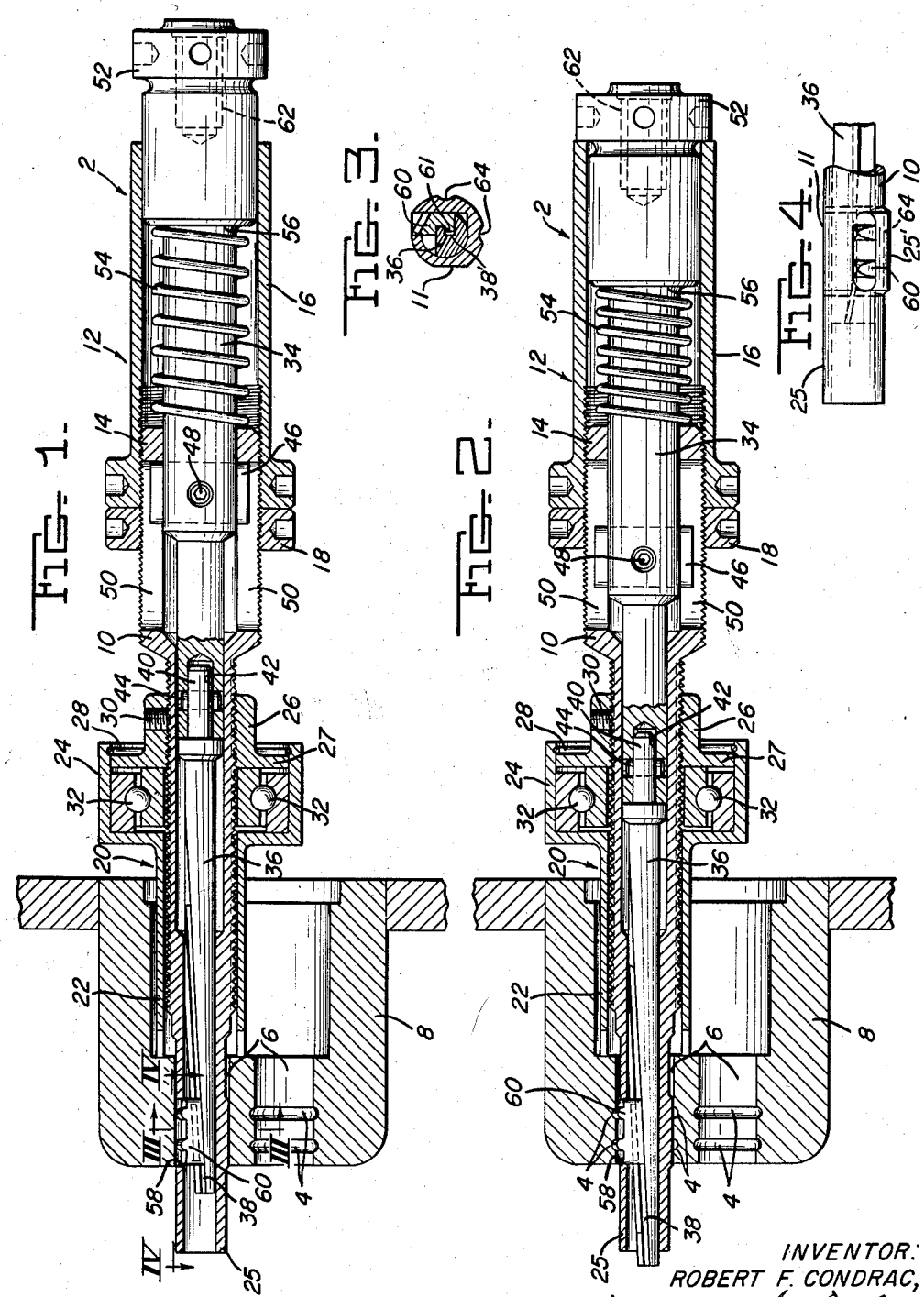

2,869,404

CUTTING TOOL

Robert F. Condrac, Pittsburgh, Pa., assignor to United States Steel Corporation, a corporation of New Jersey Application November 30, 1955, Serial No. 549,929

2 Claims. (Cl. 77—58)

It is an object of the present invention to provide an improved cutting tool especially suitable for cutting internal circumferential grooves in the wall of an opening in a workpiece.

The present invention is exemplified by an apparatus especially designed to cut internal circumferential grooves in the bore of a cupped workpiece for receiving light wall tubing which is subsequentially rolled thereinto, but the principles may be applicable to perform any cutting action, such as grooving, chamfering, deburring, form cutting, etc., perpendicular to the axis of a hole in other objects such as heat exchangers, etc. This exemplary apparatus has the advantages that it can cut an internal circumferential groove in the wall of an opening in a workpiece more precisely toward perfection, more accurately, and with less tool breakage, than has heretofore been usual.

Having reference to the accompanying drawings illustrating this exemplary apparatus, the various figures are as follows:

Figure 1 is a longitudinal section showing the tool of the invention positioned prior to operation;

Figure 2 is a view similar to Figure 1 showing the tool in operating position;

Figure 3 is an enlarged detail cross-sectional view taken on the line III—III of Figure 1; and Figure 4 is an enlarged detail longitudinal sectional view taken substantially on the line IV—IV of Figure 1 showing the chip clearance flat on the outer surface of the cutter housing element.

Referring more particularly to the drawings reference numeral 2 designates generally the assembled tool of my invention to be used, as shown in Figures 1 and 2, for cutting internal circumferential grooves 4, 4 in the bore 6 of a cupped workpiece 8. The tool is provided with an open end tubular housing 10 and an elongated open end tubular stop member 12 which is threaded around the rearward end 14 of the housing 10 with a sleeve portion 16 thereof projecting longitudinally and rearwardly of the housing. The stop member 12 is maintained in position by means of a lock nut 18.

An abutment member 20, having an extended sleeve portion 22 at one end and an enlarged diameter portion 24 at its other end, is mounted on the housing intermediate its forward end 25 and the stop member 12. The abutting member 20 is secured to the housing 10 for axial movement therewith by means of a lock nut 26. The lock nut 26 is provided with an enlarged peripheral flange 27 at one end which is rotatably disposed within the enlarged diameter portion 24 of the abutting member 20 by means of a lock ring 28. The main body of the lock nut 26 is rigidly secured on the exterior of the housing 10 by a suitable set screw 30. Anti-friction bearings 32 disposed within the enlarged diameter portion 24 of the abutment 20 permit free relative rotation of the housing and the abutting member. As best shown in Figure 2, the races containing the bearings 32 are offset to achieve floating action frictionless rotation and provide clearance between peripheral flange 27 and the race contained by the enlarged diameter portion 24 of the abutting member 20. This arrangement provides flexibility so that the tool may be used with a conventional hand operated power means such as an electric drill. As will be more clearly understood as this description proceeds, it is the purpose of the abutting member to engage the workpiece being processed around the periphery of the opening wherein the grooves are to be cut so as to provide an abutment permitting axial movement of a portion of the tool into the opening.

A plunger 34 is mounted for reciprocal movement within the housing 10. The plunger is provided with a tapered forward section 36 having a groove 38 extending along the surface thereof. One side of groove 38 is provided with a slot 38' extending therealong which functions as one part of a tongue-and-groove connection for a cutter as will be more fully explained hereinafter. The rearward end of the section 36 has a shank 40 projecting therefrom that fits into an opening 42 in the plunger 34 and is held therein by means of a dowel pin 44.

The plunger 34 is connected with the housing 10 by a spline connection which consists of a key 46 which, by means of a set screw 48, is fixedly mounted in a transverse slot in the plunger with radially extending portions thereof slidingly fitted in a pair of opposed longitudinal grooves 50 in the housing 10. The spline connection permits the plunger to move axially relative to the housing but connects the plunger and the housing so that they will rotate together.

A portion 52 of the plunger 34 projects outwardly of the rearward end of the sleeve 16 of the stop member 12. The projecting portion 52 has a diameter greater than the inside diameter of the sleeve 16 so that the portion 52 of the plunger abuts the rearward end of the sleeve 16 when the plunger is moving inwardly of the housing 10.

A helical spring 54 is mounted around the body of the plunger 34 abutting the rearward end 14 of the housing 10 at one end and a shoulder 56 formed by an enlarged diameter portion on the plunger 34. The spring 54 constantly urges the plunger in the direction outwardly and rearwardly of the housing 10.

The forward end of the housing 10 is provided with an opening 58 in its wall for receiving a cutting tool 60 which is slidably mounted in the groove 38 of the forward section 36 of the plunger. As shown in Figure 3, the bottom of the cutter 60 is formed with a tongue extension 61 which fits into the slot 38' of groove 38. This arrangement constitutes a tongue-and-groove connection between the cutter 60 and the plunger 34 to provide positive retention of the cutter within the groove while permitting sliding movement of the cutter therealong. The cutting tool 60 normally is confined in the opening 58 with its cutting edges flush with the exterior surface of the housing 10 when the tool is not in operation.

A portion 25' of forward end 25 in the plane of cutter 60 is nonsymmetrically thicker than portions adjacent thereto. A chip clearance flat 11 is formed by the nonsymmetrical portion 25' tangent to the opening 58, as best shown in Figures 3 and 4. A pair of spaced, longitudinally extending flutes 64, one located approximately 90 degrees away and the other approximately 180 degrees away from opening 58, are formed in portion 25' (Figures 3 and 5) for a purpose which will become apparent hereinafter.

In operation, as in forming the grooves 4, 4 in the bore 6 of the cupped workpiece 8, the tool is positioned with the forward end of the housing inserted in the bore 6, and the end of the sleeve 22 of the abutting member engaging the surface of the cupped workpiece adjacent the bore 6, as shown in Figure 1. It will be noted that the length of the sleeve 22 of the abutting member may be varied in accordance with the depth of bore to be worked on and the desired position of the grooves within the bore. After the tool is thus positioned the plunger is pressed forward by applying force to its projecting end 52, this causes the cutter 60 to be projected radially outward, as shown in Figure 2. The tongue-and-groove mounting of the cutter on the plunger results in positive projection of the cutter when the plunger is thrust forward and positive withdrawal of the cutter from the work surface when the plunger is released. Thus, jamming of the tool due to the cutter sticking in the workpiece is prevented. Then the plunger and housing are rotated to cut the desired grooves. During the cutting operation, the flutes 64 automatically deburr the edges of the grooves in the workpiece. As the cutter 60 forms the grooves, the nonsymmetrically thicker portion 25' of end 25 rotates as a pilot in the bore and the two flutes 64 trail the cutter causing the burrs at the lips of the grooves cut in the workpiece to be rolled off into the flutes. I have found it convenient to provide a tapped hole 62 in the end of the plunger 34 for receiving the threaded spindle of an electric drill (not shown) to supply the rotative power for the tool.

While one embodiment of my invention has been shown and described, it will be apparent that other adaptations and modifications may be made without departing from the scope of the following claims.

I claim:

1. Apparatus for cutting an internal circumferential groove in the wall of an opening in a workpiece which comprises an open end tubular housing, an elongated open end tubular stop member fixedly mounted around one end of said housing with a portion thereof projecting longitudinally of said housing, an abutment member supported on said housing intermediate its ends for axial movement therewith adapted to bear against said workpiece adjacent said opening, a plunger mounted for reciprocal movement within said housing and said stop member, said plunger extending along substantially the full length of said housing and said stop member with a portion thereof projecting outwardly and longitudinally of said stop member away from said housing, the longitudinal axis of said plunger coinciding with the longitudinal axis of said housing, stop member and abutment member, the end of the projecting portion of said plunger having a diameter greater than the inside diameter of said stop member, spring means on said plunger for urging the same axially of said housing in the direction toward said greater diameter end, a spline connection securing said housing to said plunger, the end of said plunger remote from its projecting portion being tapered in the direction away from said projecting end, said housing having a transverse opening through the wall thereof adjacent its end remote from said stop member, said housing including a non-symmetrically thicker portion in the plane of said opening, said non-symmetrically thicker portion of said housing having a pair of spaced flutes on the periphery thereof radially spaced from said opening, the tapered end of said plunger having a longitudinal groove along the surface thereof, a cutter slidingly fitted in said groove and projecting therefrom into said opening whereby axial movement of said plunger in one direction projects said cutter radially outward and axial movement of said plunger in the opposite direction withdraws said cutter radially inward, the cutting edge of said cutter extending in a plane substantially parallel with the longitudinal axis of said housing and being curved about a radius extending normal to the longitudinal axis of said housing.

2. Apparatus for cutting an internal circumferential groove as defined by claim 1 characterized by said abutment member including a sleeve having an enlarged diameter portion at one end rotatably mounted on said housing, anti-friction bearings in said enlarged diameter portion engaging said sleeve and said housing, a lock ring having a circumferential flange around one end fixedly mounted on said housing with said flange rotatably engaged by the enlarged diameter portion of said sleeve for securing the same to said housing for axial movement therewith.

References Cited in the file of this patent

UNITED STATES PATENTS

| | | |
|---|---|---|
| 1,835,651 | Ihsen | Dec. 8, 1931 |
| 2,247,283 | Young | June 24, 1941 |
| 2,365,549 | Haynes | Dec. 19, 1944 |
| 2,545,443 | Bowren | Mar. 20, 1951 |